United States Patent
Matsuyama

(10) Patent No.: US 6,826,338 B2
(45) Date of Patent: Nov. 30, 2004

(54) OPTICAL FIBER CABLE HAVING A PARTITIONING SPACER

(75) Inventor: Yoshitaka Matsuyama, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/076,522

(22) Filed: Feb. 19, 2002

(65) Prior Publication Data

US 2002/0191924 A1 Dec. 19, 2002

(30) Foreign Application Priority Data

Feb. 28, 2001 (JP) .................................. 2001-053625

(51) Int. Cl.$^7$ ............................................... G02B 6/44
(52) U.S. Cl. ..................... 385/110; 385/105; 385/112
(58) Field of Search ............................. 385/110, 105, 385/112

(56) References Cited

U.S. PATENT DOCUMENTS

| | | | | |
|---|---|---|---|---|
| 4,596,443 A | * | 6/1986 | Diemeer et al. | 385/110 |
| 4,772,089 A | * | 9/1988 | Ide et al. | 385/113 |
| 4,784,462 A | * | 11/1988 | Priaroggia | 385/110 |
| 4,787,705 A | * | 11/1988 | Shinmoto et al. | 385/104 |
| 4,804,245 A | * | 2/1989 | Katayose et al. | 385/110 |
| 5,087,110 A | * | 2/1992 | Inagaki et al. | 385/110 |
| 5,289,556 A | * | 2/1994 | Rawlyk et al. | 385/112 |
| 5,760,139 A | | 6/1998 | Koike et al. | |
| 5,761,361 A | * | 6/1998 | Pfandl et al. | 385/100 |
| 5,783,636 A | | 7/1998 | Koike et al. | |
| 5,892,873 A | * | 4/1999 | Tatat | 385/107 |
| 5,916,971 A | | 6/1999 | Koike et al. | |
| 5,952,615 A | * | 9/1999 | Prudhon | 174/113 C |
| 6,071,441 A | | 6/2000 | Koganezawa et al. | |
| 6,074,511 A | | 6/2000 | Takano et al. | |
| 6,111,062 A | | 8/2000 | Shirota et al. | |
| 6,166,125 A | | 12/2000 | Sugiyama et al. | |
| 6,221,987 B1 | | 4/2001 | Sugiyama | |
| 6,225,382 B1 | | 5/2001 | Matsukura et al. | |
| 6,239,363 B1 | * | 5/2001 | Wooters | 174/47 |
| 6,271,312 B1 | | 8/2001 | Koike et al. | |
| 6,297,454 B1 | * | 10/2001 | Gareis | 174/113 C |
| 6,365,836 B1 | * | 4/2002 | Blouin et al. | 174/113 C |
| 6,448,452 B2 | | 9/2002 | Kashiwagi et al. | |
| 6,500,365 B1 | * | 12/2002 | Cecchi et al. | 264/1.28 |
| 6,596,944 B1 | * | 7/2003 | Clark et al. | 174/113 C |

FOREIGN PATENT DOCUMENTS

| | | | | |
|---|---|---|---|---|
| EP | 189666 A1 | * | 8/1986 | G02B/6/44 |
| EP | 0 996 016 | | 4/2000 | |
| GB | 2123978 A | * | 2/1984 | G02B/5/14 |
| GB | 2 184 563 | | 6/1987 | |

OTHER PUBLICATIONS

U.S. patent application Ser. No. 10/076,522, filed Feb. 19, 2002, pending.

(List continued on next page.)

Primary Examiner—Hae Moon Hyeon
(74) Attorney, Agent, or Firm—Oblon, Spivak, McClelland, Maier & Neustadt, P.C.

(57) ABSTRACT

An optical fiber cable including an axial portion and a plurality of portioning plate portions housed in a space encircled by a sheath; and the axial portion and the portioning plate having a sectional shape that the partitioning plate portions radially extend toward an inner circumferential surface of the sheath from the axial portion; wherein the space is divided into a plurality of partitioned slots by the partitioning plate portions having leading ends provided with enlarged portions in contact with the inner circumferential surface of the sheath and connecting portions connecting the enlarged portions to the axial portion, and optical fibers are distributed so that two or more optical fibers are not provided in a single partitioned slot.

17 Claims, 4 Drawing Sheets

OTHER PUBLICATIONS

U.S. patent application Ser. No. 10/247,643, filed Sep. 20, 2002, pending.
U.S. patent application Ser. No. 10/262,897, filed Oct. 3, 2002, pending.
U.S. patent application Ser. No. 10/310,802, filed Dec. 6, 2002, pending.

Patent Abstracts of Japan, JP 60–222809, Nov. 7, 1985.
Patent Abstracts of Japan, JP 11–190813, Jul. 13, 1999.
Patent Abstracts of Japan, JP 04–253112, Sep. 8, 1992.
Patent Abstracts of Japan, JP 06–258559, Sep. 16, 1994.
Patent Abstracts of Japan, JP 55–070807, May 28, 1980.
Patent Abstracts of Japan, JP 57–115505, Jul. 19, 1982.

* cited by examiner

OPTICAL FIBER CABLE HAVING A PARTITIONING SPACER

BACKGROUND OF THE INVENTION

1. Field of the Invention

The present invention relates to an optical fiber cable (hereinbelow, referred to as "optical cable"), in particular, an optical cable employing plastic optical fibers.

2. Discussion of the Background

Optical fibers have been widely employed to transmit high volume of information fast and reliably in recent communication. The optical fibers include silica optical fibers, such as silica single-mode optical fibers, plastic optical fibers (POF) and other fibers. In particular, the plastic optical fibers have a larger diameter than the silica single-mode optical fibers and are excellent in flexibility. From this viewpoint, the optical cables, which employ plastic optical fibers has optical transmission lines, are excellent in workability in end treatment and connection treatment of the optical fibers needed during installation, and in wiring. The optical cables are effective as a short distance trunk in a building after lead-in from a trunk cable, a branch cable, or a line cable for a Local Area Network (LAN) system.

The optical cables are usually configured to cover optical fibers and tensile strength reinforcing members (tension members) for avoiding elongation of the optical fibers due to tension with a sheath. In general, the optical fibers have a primary resin covering applied on a surface to prevent disturbance light from entering, to avoid damage due to a mechanical external force, or for another reason. In the case of optical cables for communication, two or more optical fibers for both input and output are usually housed.

One of the optical cables comprises optical fibers 41a and 41b, primary covering layers 42a, 42b for covering the optical fibers, and a secondary covering layer 43 for covering the optical fibers as shown in FIG. 4(a) for instance (see, e.g., JP-A-11-211954).

The optical cable shown in a schematic sectional view of FIG. 4(b) has a structure wherein two optical fibers 44a and 44b are provided in a cavity 46 delimited by a sheath 45, and tensile strength reinforcing members are embedded in the sheath (see, e.g., JP-U-60-60714).

The light cable shown in a schematic sectional view of FIG. 4(c) has a structure wherein an optical fiber 48 having a surface covered with a primary covering layer 47 is arranged in a cavity 50 delimited by a sheath 49 (see, e.g., JP-A-7-72356).

However, the optical cables that have been proposed or used have raised the following problems:

1) In the cable having the structure shown in FIG. 4(a), a heat test (at 70° C. for 24 hours) shows that a resin, such as polyethylene, as the covering material is heat-shrunk to form microvents in the surfaces of the optical fibers, which create a problem of resistance to heat in terms of an increase in attenuation.

2) In the cable having the structure shown in FIG. 4(b), the provision of the plural optical fibers in a single cavity creates a problem of resistance to pressure that, when an external force, which is caused, e.g., when a person steps on the cable, is applied to the cable, the plural optical fibers in the single cavity get in contact with each other, are pressed each other, be squashed each other at the worst, or are subjected to plastic deformation to increase attenuation.

3) In the cable having the structure shown in FIG. 4(c), an increase in attenuation, which is caused by flexing action during bending, can be suppressed by determining the unoccupied ratio of the optical fiber in the cavity at 2–30%. However, there is created a problem of mechanical properties, such as an impossibility in avoiding an increase in attenuation to flexing action during bending since the upper limit of the unoccupied ratio is restricted in terms of connection with an optical connector, which is required when the optical cable is connected to the optical connector.

In particular, a graded refractive index plastic optical fiber (hereinbelow, referred to as "GI-POF"), which is prospective as an optical fiber for next-generation communication because of a fast and large volumetric data-carrying capacity, realizes a fast and large volumetric data-carrying capacity by having a refractive index distribution in a sectional direction of the fiber. An optical cable that houses a GI-POF is sensitive to generation of microvents caused by heat-shrinkage of a covering material, application of an external force, flexing action during bending or other factors, and transmission properties are likely to be deteriorated by these disturbances.

The production of an optical cable having a GI-POF is carried out by covering and molding a GI-POF and a structural element, such as a tension member, for protection against tension with, e.g., an extruded thermoplastic resin. There is a possibility that a low molecular chemical compound in the GI-POF is thermally defused by thermal affection from, e.g., the thermoplastic resin molten at a high temperature to change the refractive index distribution of the GI-POF during the production. From this viewpoint, it is necessary to carry out the production so that the GI-POF is not thermally affected during covering and molding.

BRIEF SUMMARY OF THE INVENTION

It is an object of the present invention to provide an optical cable excellent in resistance to heat and mechanical properties to flexing action, and capable of preventing attenuation from increasing.

The present invention provides an optical fiber cable comprising two or more optical fibers and a partitioning spacer housed in a space encircled by a sheath; the partitioning spacer including an axial portion and a plurality of partitioning plate portions; the partitioning spacer having a sectional shape that the partitioning plate portions radially extend toward an inner circumferential surface of the sheath from the axial portion; and each of the partitioning plate portions having a leading end provided with an enlarged portion in contact with the inner circumferential surface of the sheath and a connecting portion connecting the enlarged portion to the axial portion; wherein the space encircled by the sheath is divided into a plurality of partitioned slots by the partitioning plate portions, and the respective optical fibers are distributed so that two or more optical fibers are not provided in a single partitioned slot.

It is preferable that the sectional shape of the partitioning spacer has the following relations (1) and (2) wherein each of the enlarged portion has a maximum dimension L in a direction perpendicular to a radial direction, each of the connecting portion has a length K in the radial direction, each of the connecting portion has a dimension W in the direction perpendicular to the radial direction, and each of the optical fibers has an outer diameter R:

$$L - W \geq R \quad (1)$$
$$K \geq R \quad (2)$$

The optical fiber cable is appropriate as a cable with graded refractive index plastic optical fibers (GI-POF) employed therein.

It is preferable that at least one tension member is provided in a partitioned slot without an optical fiber provided therein. At least one of a power line and an information transmission line may be provided in a partitioned slot without an optical fiber provided therein.

It is preferable that the sheath has a hardness of not higher than 95 Shore A hardness. In this case, it is preferable that the sheath is made of thermoplastic resin, and the thermoplastic resin is one selected from soft vinyl chloride, chlorinated polyethylene and soft polyethylene.

The present invention also provides a method for preparing the optical fiber cable stated earlier, comprising distributing the optical fibers in the partitioning spacer, and then forming the sheath by thermoplastic resin extruded from a resin extruder. In the method, it is preferable that the partitioning spacer is heat-treated under a thermal environment at 70–90° C. before preparation of the optical fiber cable.

An optical fiber to be accommodated in the optical cable according to the present invention is a bare optical fiber or an optical fiber cord, which is made of a plastic. The optical fiber cord covers one wherein at least one bare optical fiber is covered with a covering (including a ribbon fiber and the like). Although there is no particular limitation on the material for the covering, a thermoplastic resin for covering a bare optical fiber is applicable. Examples of the thermoplastic resin are polyethylene, polyvinyl chloride, polymethyl methacrylate and an ethylene-tetrafluoroethylene copolymer.

Examples of the bare optical fiber are one made of fluororesin, one made of polymethyl methacrylate (PMMA) resin, and one made of polycarbonate resin. Among them, one made of fluororesin or one made of PMMA resin is preferable in terms of excellent transmission performance. One made of fluororesin is particularly preferable since the wavelength of employed light can be selected from a wide range. As the fluororesin, amorphous fluororesin having substantially no C—H bond is preferable.

As the optical fiber according to the present invention, a multi stepped refractive index optical fiber, a graded refractive index optical fiber and the like are preferable, and a graded refractive index optical fiber is more preferable. A specific example of such a graded refractive index optical fiber made of fluororesin is one disclosed in JP-A-8-5848.

In the optical fiber according to the present invention, a sheath, which encircles a space for housing optical fibers, is preferably made of thermoplastic resin. It is preferable that the sheath has a hardness of not higher than 95 Shore A hardness, in particular a hardness of 70–80 Shore A hardness. Although there is no limitation on the thermoplastic resin, examples of the thermoplastic resin are soft vinyl chloride, chlorinated polyethylene and soft polyethylene. Among them, soft vinyl chloride is preferable in terms of moldability at a low temperature.

A partitioning spacer, which is housed along with the optical fibers in the space encircled by the sheath, includes an axial portion and a plurality of partitioning plate portions. The partitioning spacer has a sectional shape that the partitioning plate portions radially extend toward an inner circumferential surface of the sheath from the axial portion. Each of the partitioning plate portions has a leading end provided with an enlarged portion in contact with the inner circumferential surface of the sheath and a connecting portion connecting the enlarged portion to the axial portion.

The partitioning plate portions provide partitioned slots wherein the optical fibers are distributed. The respective optical fibers are distributed so that two or more optical fibers are not provided in a single partitioned slot. This arrangement can prevent an optical fiber from contacting another optical fiber, and an optical fiber and another optical fiber from pushing against each other. The sectional shape of the partitioning plate portions is appropriately determined, depending on the number of the optical fibers, the outer diameter of the optical fibers, the presence and absence of a tension member, the shape of the respective members, the disposition pattern of the respective members and the like. As specifically shown in FIG. 1 stated later, it is particularly preferable that the sectional shape of the partitioning spacer has the following relations (1) and (2) wherein the enlarged portion has a maximum dimension L in a direction perpendicular to a radial direction (hereinbelow, referred to as "the maximum sectional dimension"), the connecting portion has a length K in the radial direction, the connecting portion has a dimension W in the direction perpendicular to the radial direction, and an optical fiber has an outer diameter R:

$$L-W \geq R \quad (1)$$

$$K \geq R \quad (2)$$

The partitioning spacer may be formed to have the partitioned slots spirally provided therein in the longitudinal direction thereof, i.e., the longitudinal direction of the optical cable. The spiral partitioning spacer offers advantages in that neither difference in length between the inner circumference and the outer circumference nor increase in attenuation is produced at the time of winding the optical cable since the optical fibers are equally located on the outer circumferential side and the inner circumferential side of the optical cable along the spirals of the partitioning spacer.

The partitioning spacer is preferably molded by extrusion since the spacer needs to maintain structural continuity in the sectional shape in the longitudinal direction of the optical cable. As to the material for the partitioning spacer, thermoplastic resin having a relatively low hardness, such as soft (low density) polyethylene or soft vinyl chloride, is appropriate. When a material, which has a stretching ratio of not higher than 2% in the longitudinal direction of the optical cable under a tensile load of 220 N, is employed to form the partition spacer, the partition spacer per se can function as the tension member, which offers an advantage in that the tension member can be eliminated.

From the viewpoint that the thermal hysteresis of the partitioning spacer given at the time of molding the spacer is removed in order to restrain the deformation due to heat given during preparation of the optical cable, it is effective that the partitioning spacer is heat-treated under a thermal environment at 70–90° C. before being housed in the spacer encircled by the sheath.

In the optical cable according to the present invention, at least one tension member is provided in a partitioned slot without an optical fiber provided therein to protect the optical fibers against tension of the optical cable, except in cases where the partitioning spacer mainly function as the tension member. There is no limitation on the material for the tension member. Examples of the material are a wire material, such as a metal wire or an FRP wire, or highly stiff continuous fiber, such as aramid continuous fiber. In particular, highly stiff continuous fiber, such as aramid continuous fiber, is preferable in terms of ease in bending of the optical cable and a reduction in damage to the optical fibers when an external force, such as impact or pressure, is applied to the optical cable.

It is advantageous, for simplification in wiring work in a building or another place, that at least of a power line and an information transmission line is provided in a partitioned slot without an optical fiber provided therein. Examples of the information transmission line are a coaxial cable, an unshielded twisted pair wire (UTP) and the like.

The present invention provides a method for preparing the optical fiber cable stated earlier, which is characterized in that the method comprises forming the sheath by a thermoplastic resin extruded from a resin extruder after distributing the optical fibers in the partitioning spacer.

DETAILED DESCRIPTION OF THE INVENTION

Now, the present invention will be described in detail in reference to the schematic sectional view of FIG. 1 with respect to the optical cable according to an embodiment of the present invention, wherein two GI-POFs are housed.

Figure 1:
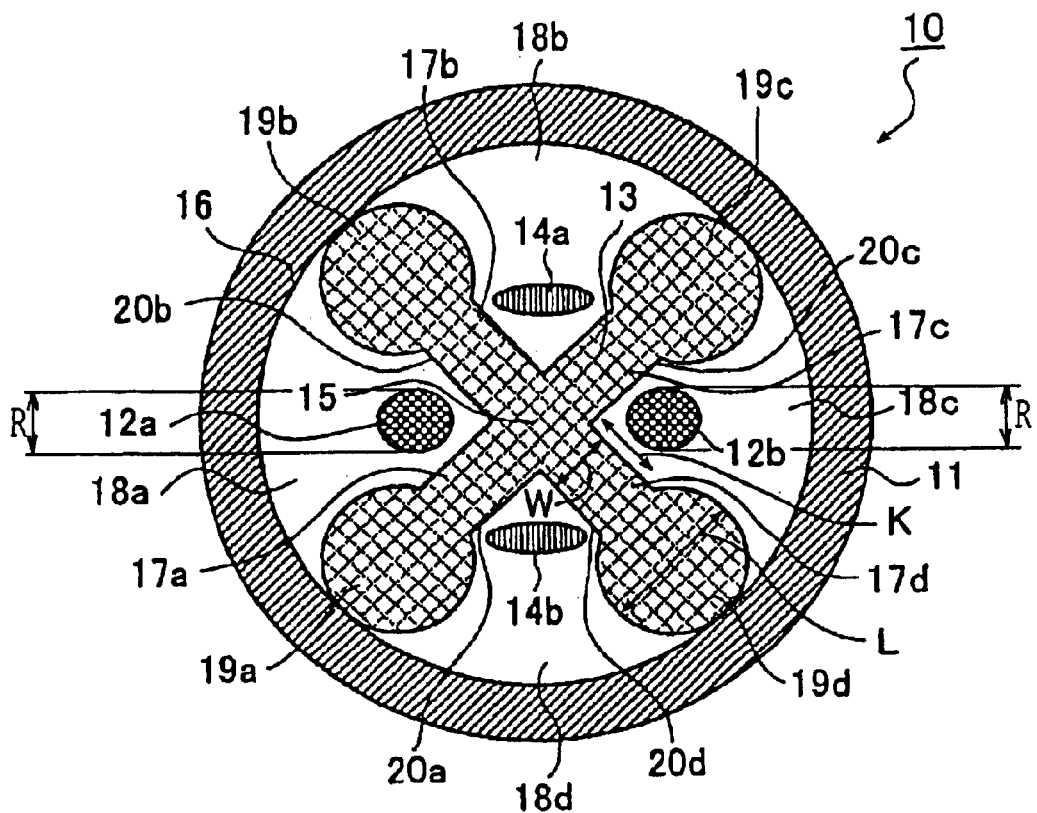
FIG. 1 is a schematic sectional view of the optical cable according to an embodiment of the present invention.

The optical cable 10 shown in FIG. 1 has a pair of GI-POFs 12a and 12b, a partitioning spacer 13, and tension members 14a and 14b housed in a space encircled by a sheath 11.

The partitioning spacer 13 includes an axial portion 15, and four partitioning plate portions 17a, 17b, 17c, 17d. Each of the partitioning plate portions 17a, 17b, 17c, 17d has a sectional shape that each radially extends from the axial portion 15 toward an inner circumferential surface 16 of the sheath 11. The partitioning plate portions 17a, 17b, 17c, 17d divide the space encircled by the sheath 11 into four divided slots 18a, 18b, 18c, 18d, which extend in the longitudinal direction of the partitioning spacer 13.

The respective partitioning plate portions 17a, 17b, 17c, 17d have leading ends provided with enlarged portions 19a, 19b, 19c, 19d formed in a substantially circular shape in section and in contact with the inner circumferential surface 16 of the sheath 11. The respective enlarged portions 19a, 19b, 19c, 19d are connected to the axial portion 15 through connecting portions 20a, 20b, 20c, 20d.

In the optical cable 10 shown in FIG. 1, the GI-POFs 12a and 12b are provided in the partitioned slots 18a and 18c, respectively, so that two or more GI-POFs are not provided in a single partitioned slot. In the respective partitioned slots 18b and 18d are provided the tension members 14a and 14b, which have a greater tensile stiffness than the GI-POFs 12a and 12b.

In the optical cable shown in FIG. 1, it is preferable, for suppressing an increase in attenuation in the GI-POFs 12a and 12b due to an external compressive load, that the maximum sectional dimension of each of the enlarged portions 19a, 19b, 19c, 19d in a substantially circular shape, i.e., the diameter L of each of the enlarged portions 19, the length K of each of the connecting portions radially measured, the dimension of the connecting portions 20a, 20b, 20c, 20d in a direction perpendicular to the radial direction, i.e., the width W of each of the connecting portions 20, and the outer diameter R of the GI-POFs in section have the following relations (1) and (2):

$$L - W \geq R \tag{1}$$

$$K \geq R \tag{2}$$

For example, when the GI-POFs 12a and 12b have an outer diameter R of 0.5 mm in section, it is preferable that the diameter L of the enlarged portions 19a, 19b, 19c, 19d, which are provided on the leading edges of the partitioning plate portions 17a, 17b, 17c, 17d and are formed in a substantially circular shape in section, is 1 mm or longer, the length K of the connecting portions 20a, 20b, 20c, 20d radially measured is 0.5 mm or longer, and the width W of the connecting portions 20a, 20b, 20c, 20d is 0.5 mm or shorter in the partitioning spacer 13.

By determining the dimensions of the respective portions thus, the following advantage can be provided.

When the sheath 11 has an external compressive load applied thereto as an external force in the vertical direction on the sheet of FIG. 1, the partitioning spacer 13 is deformed. However, an increase in attenuation in the GI-POFs 12a and 12b due to the external compressive load can be suppressed since the enlarged portions 19a and 19b ensure a space having a greater diameter than the GI-POF 12a in the partitioned slot 18a and since the enlarged portions 19c and 19d ensure a space having a greater diameter than GI-POF 12b in the partitioned slot 18c.

When the sheath 11 has an external compressive load applied thereto as an external force from a lateral direction on the sheet of FIG. 1, the partitioning spacer 13 is deformed, and the GI-POFs 12a, 12b are sandwiched between the partitioning spacer 13 and the sheath 11. However, when the sheath 11 has a hardness of not higher than 95 Shore A hardness, the increase in attenuation of the GI-POFs 12a and 12b due to the external compressive load can be suppressed since the sheath 11 is sufficiently soft in comparison with the GI-POFs 12a and 12b to accept the GI-POFs 12a and 12b in embedded fashion. Since the GI-POFs 12a and 12b are separately provided by the partitioning spacer 13, any permanent deformation due to mutual contact of the fibers can be prevented to suppress an increase in attenuation, which is advantageous.

Figure 2:
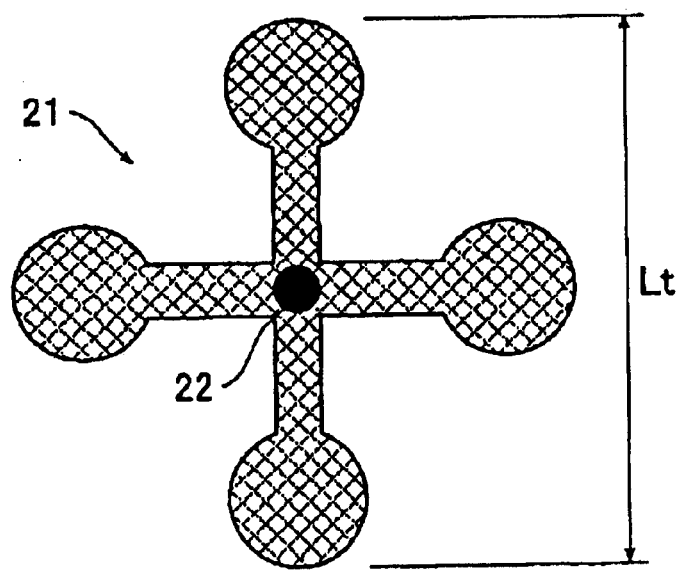
FIG. 2 is a schematic sectional view of the partitioning spacer in the optical cable according to another embodiment of the present invention.

A partitioning spacer 21 that is configured to include a tension member 22 in an axial portion thereof as shown in FIG. 2 is appropriate. There is no limitation on the location of the tension member 22 as long as the tension member is in the axial portion of the partitioning spacer 21.

Figure 5:
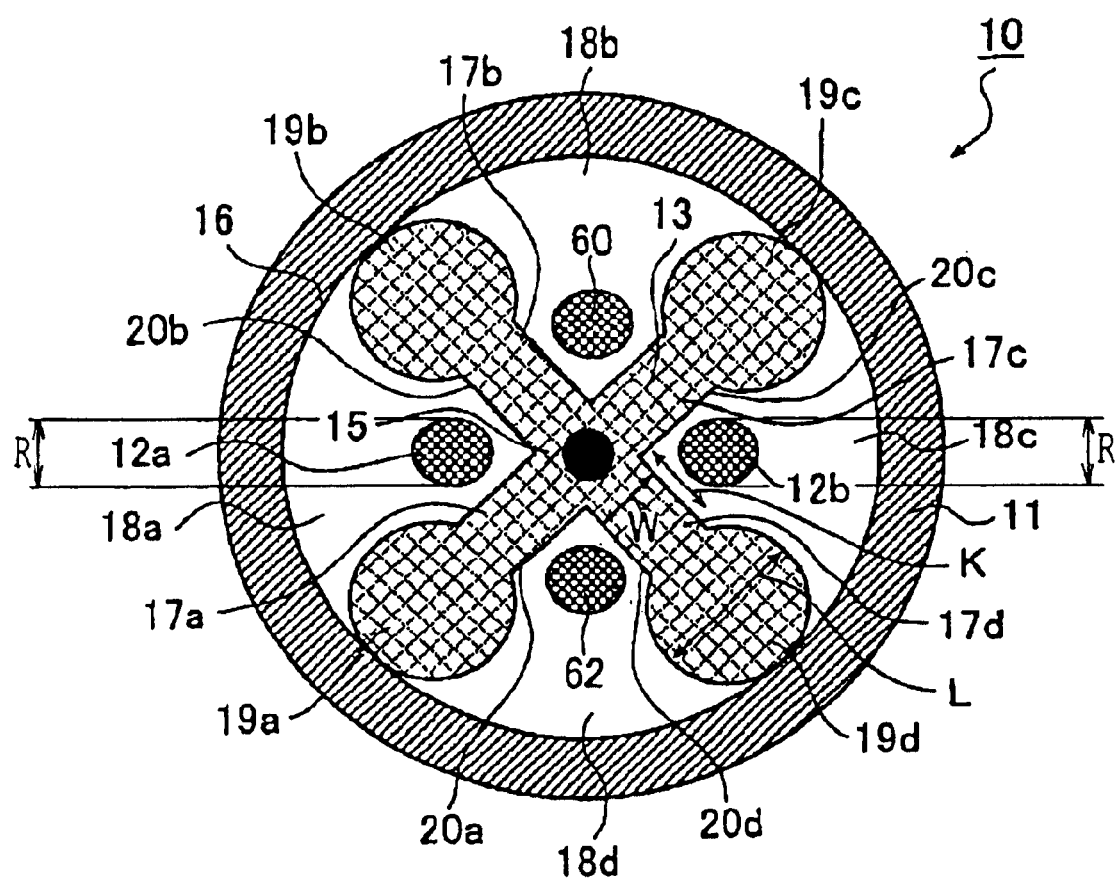
FIG. 5 is a schematic view of the optical cable according to a further alternative embodiment of the present invention.

FIG. 5 depicts an alternative embodiment in which a power line 60 is provided in portioned slot 18b, and an information transmission line 62 is provided in portioned slot 18d.

There is no particular limitation on the method or the apparatus for preparing the optical cable according to the present invention. Any method or any apparatus is applicable as long as the optical cable having the structure as stated earlier can be prepared. For example, the case wherein the optical cable having the structure shown in FIG. 1 is prepared according to the method shown in FIG. 3 will be explained. The GI-POFs 12a and 12b reeled out from GI-POF suppliers 30a and 30b, the partitioning spacer 13 reeled out from a partitioning spacer supplier 31, and the tension members 14a and 14b reeled from a tension member supplier 32 are supplied to a GI-POF twister 33. At the GI-POF twister 33, the GI-POFs 12a and 12b are respectively introduced into the partitioned slots 18a and 18c of the partitioning spacer 13, and the tension members 14a and 14b are respectively introduced into the partitioned slots 18b and 18d. After that, the spacer with these parts introduced therein is supplied to a nipple conduit (not shown) of a covering die 34 and is incorporated, at the leading nipple (not shown) of the covering die 34, with a resin material for the sheath 11 extruded from a resin extruder 35. The unit thus incorporated is completed by being provided with a certain shape at the outlet of the covering die 34 and cooled in a cooling bath 36.

It is preferable that the tension that is applied to the GI-POFs at the reeled-out time is 5–100 g. When the tension is beyond 100 g, there is a possibility that the GI-POFs are significantly stretched to increase attenuation. When the tension is below 5 g, there is a possibility that the GI-POFs are subjected to vibration deflection and get in contact with the heat-molten resin at the outlet of the covering die to be thermally damaged, significantly increasing attenuation. In particular, the tension is preferably 20–60 g in order to minimize an increase in attenuation, and it is preferable that the GI-POFs 12a and 12b are controllably located at positions out of contact with the molten resin just after molding, i.e., the GI-POFs are controllably located at the positions where the GI-POFs have been introduced in the partitioned slots 18a and 18c of the partitioning spacer 13.

The molding speed is controlled by a pulling speed. It is preferable that the speed is controlled so that the temperature of the GI-POFs 12a and 12b, which are located in the partitioned slots 18a and 18b at the outlet of the covering die 34, is not beyond an allowable heat resistant temperature (e.g., 70° C.). When the optical cable is molded in a state where the resin molding temperature for the sheath 11 is set so that the GI-POFs 12a and 12b are subjected to the allowable heat resistant temperature or higher, the GI-POFs 12 are stretched by heat, significantly deteriorating attenuation. It is preferable that the temperature of the GI-POFs 12a and 12b at the outlet of the covering die 34 is controllably set at a lower temperature than the allowable heat resistant temperature by 20° C. or more. A temperature from 40° C. to 50° C. is preferable in the embodiment shown in FIG. 3.

When the cooling in the cooling bath 36 is carried out by use of tap water (a temperature of 5–25° C.), an increase in attenuation can be suppressed. When a refrigerant at a temperature from 0.5° C. to −20° C., e.g., a solution of 60% ethylene glycol, is used to carry out quick cooling, an increase in attenuation can be suppressed in more stable fashion.

Now, the present invention will be specifically described in reference to Examples of the present invention and a Comparative Example. In the Examples and the Comparative Example stated below, the following materials were employed, unless otherwise specified.

GI-POF: Perfluorinated GI-POF (perfluorinated amorphous fluororesin GI-POF), having a diameter of 500 μm, covered with PMMA resin, manufactured by Asahi Glass Company, Limited and put on the market on the brand name of Lucina.

Partitioning spacer: Having partitioning plate portions that are formed in cross-shaped fashion as shown in the schematic sectional view of FIG. 1, having a total length of 4 mm in the partitioning plate portions in section (Lt indicated in FIG. 2), made of low density polyethylene and heat-treated at 80° C. for 8 hours before optical cable production.

Tension member: Made of aramid continuous fibers (manufactured by DuPont and put on the market in the tradename of Kevlaryarn) and having an outer diameter of 1,140 denier.

Covering resin (sheath): Made of soft vinyl chloride (manufactured by Riken Vinyl Industry Co., Ltd.), having a thickness of 0.4 mm and having a hardness of 80 Shore A hardness.

Figure 3:
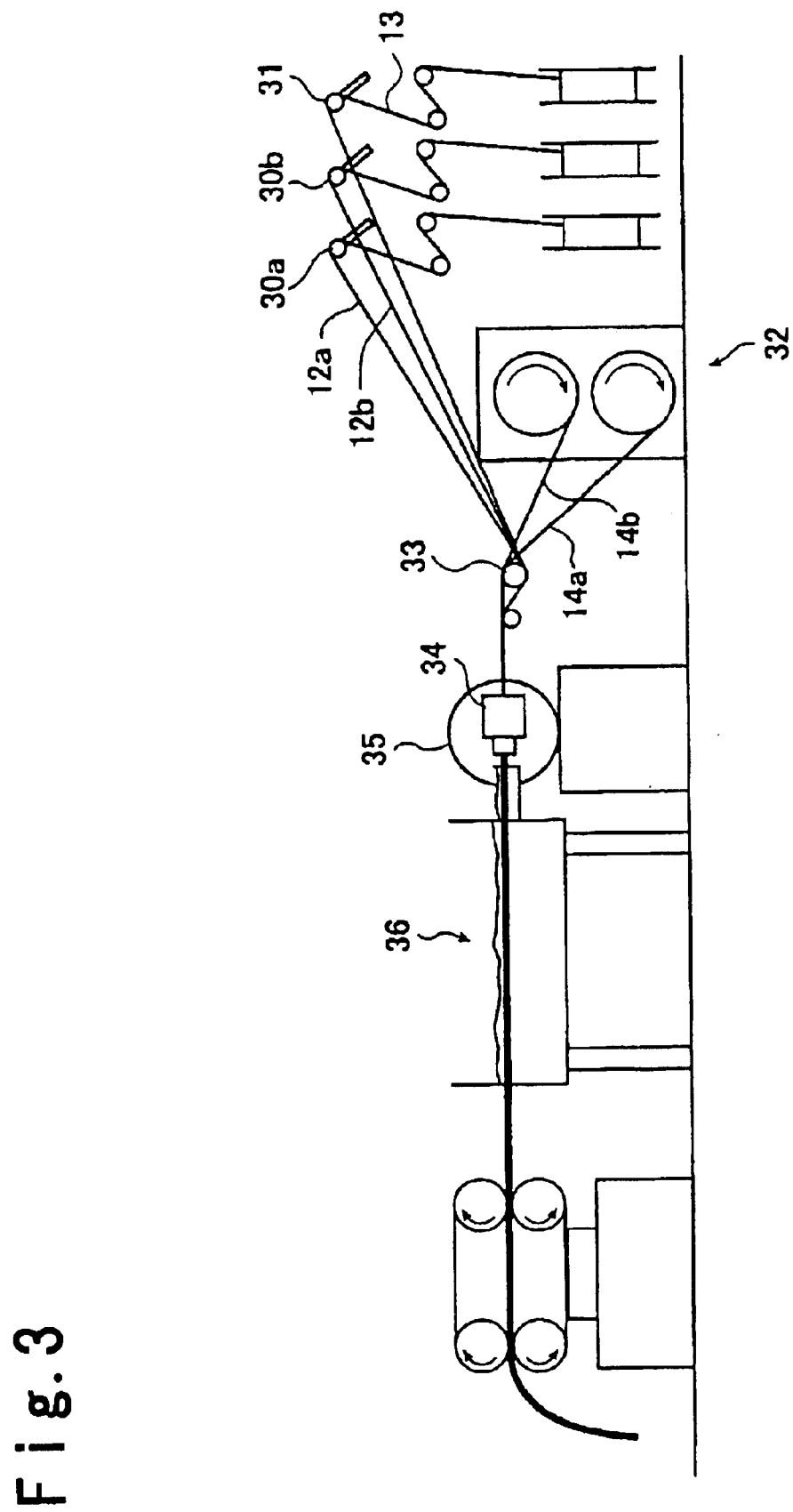
FIG. 3 is a schematic view to explain a method for preparing the optical cable according to the present invention.
Figure 4A:
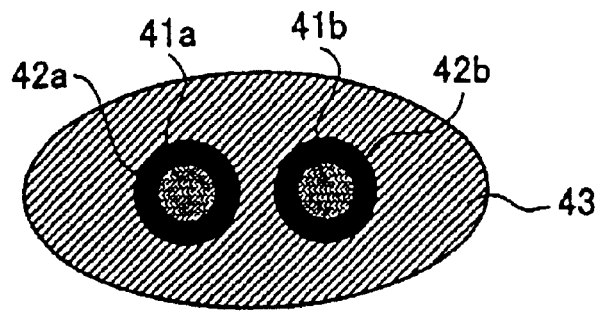
FIGS. 4(a) to 4(c) are schematic sectional views of conventional optical cables.
Figure 4B:
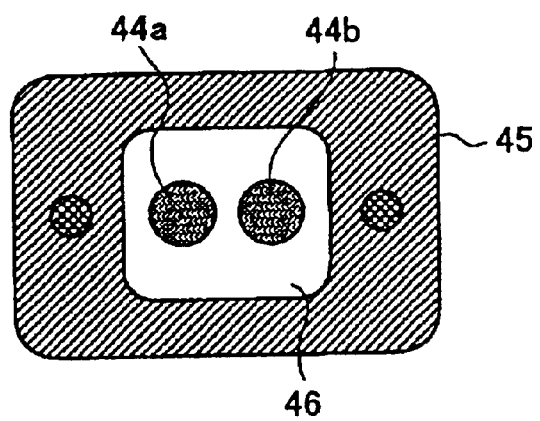
Figure 4C:
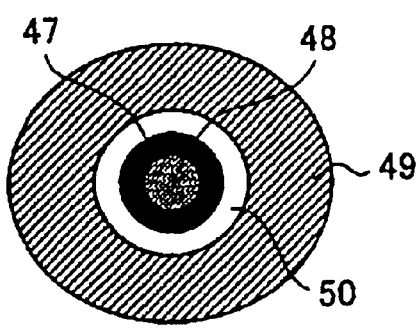

In the Examples and the Comparative Example stated below, optical cables were produced according to the method shown in FIG. 3.

EXAMPLE 1

A partitioning spacer, wherein the respective partitioning plate portions had L of 1 mm, W of 0.5 mm and K of 0.75 mm in sectional dimensions and had a total length of 4 mm in section, were employed, and two GI-POFs and two tension members were diagonally and independently provided in the partitioned slots, thereby producing an optical cable.

EXAMPLE 2

A partitioning spacer, wherein the respective partitioning plate portions had L of 0.8 mm, W of 0.3 mm and K of 1.05 mm in sectional dimensions and had a total length of 4 mm in section, were employed, and two GI-POFs and two tension members were diagonally and independently provided in the partitioned slots, thereby producing an optical cable.

EXAMPLE 3

An optical cable was produced in the same way as the Example 1 except that the sheath was made of soft vinyl chloride resin having a hardness of 95 Shore A hardness.

EXAMPLE 4

A partitioning space, which had the same shape as the Example 1, and wherein an FRP lot with aramid continuous fibers having a diameter of 0.4 mm was contained in the axial portion in the longitudinal direction, was employed, and GI-POFs were diagonally provided in the partitioned slots, thereby producing an optical cable without providing any tension member in the remaining partitioned slots.

COMPARATIVE EXAMPLE 1

A partitioning spacer, wherein the respective partitioning plate portions had L of 0.5 mm (i.e., the partitioning plate portions having no enlarged portions), W of 0.5 mm and K of 1.25 mm in sectional dimensions and had a total length of 4 mm in section, were employed, and two GI-POFs and two tension members were diagonally and independently provided in the partitioned slots, thereby producing an optical cable.

Evaluation of resistance to pressure break and a tensile test were carried out with respect to the optical cables produced in the Examples 1–4 and the Comparative Example 1 according to the following method. The evaluation results of the resistance to pressure break are shown in Table 1, and the results of the tensile test are shown in Table 2. Continuous measurement was carried out to see the attenuation of the optical fibers in the evaluation of the resistance to pressure break and the tensile test by use of a 850 nm of LD (laser diode).

Evaluation of Resistance to Pressure Break

Accordance with the method prescribed in JIS C6836, a load of 700 N per optical fiber (1400 N per two optical fibers) was applied to optical fibers in a range of a length of 10 cm for three minutes, and the pressure was released.

The criterion for evaluation of resistance to pressure break is expressed on the basis of an increase amount in attenuation in one minute after pressure release being of 0.2 dB or less of the attenuation before testing.

Tensile Test

A tensile load of 220 N was applied to the cables to measure the elongation percentage and the increasing amount in the value of attenuation with respect to each of the cables. The criteria were that the elongation percentage is 2% or less and the increase in attenuation is 1 dB or less during application of the tension load, and the increase in attenuation after release of the tension load is 0.2 dB or less.

As shown in Table 1, the cables in Examples 2 and 3 satisfied the criterion for the resistance to pressure break though the value of the attenuation during application of the tension load was above the criterion. The cable in Example 1 can improve the resistance to pressure break by adjusting the thickness of the partitioning plate portions. With regard to the Shore A hardness of the covering resin, "95" in Example 3 is an allowable value.

As shown in Table 2, the elongation percentage was suppressed to 2% or less, and there was no increase in attenuation after release of the tension load with regard to the cables with the tension members as in Examples 1 and 2.

TABLE 1

|  | L-W (mm) | Hardness of sheath (Shore A) | Increase in value of attenuation (dB) | |
|---|---|---|---|---|
|  |  |  | During application of load | After release of load |
| Ex. 1 | 0.5 | 80 | 0.4 | 0.0 |
| Ex. 2 | 0.2 | 80 | 3.0 | 0.1 |
| Ex. 3 | 0.5 | 95 | 5.5 | 0.2 |
| Comp. Ex. 1 | 0.0 | 80 | 30.0 | 20.0 |

TABLE 2

|  | Elongation percentage of cable during application of tensile load (%) | Increase in value of attenuation (dB) | |
|---|---|---|---|
|  |  | During application of load | After release of load |
| Ex. 1 | 1.9 | 0.8 | 0.0 |
| Ex. 4 | 1.0 | 0.5 | 0.0 |

The optical cable according to the present invention is excellent in heat resistance and mechanical properties to bending and can restrain attenuation from increasing. The present invention can employ plastic optical fibers, in particular GI-POFs, as optical fibers to provide an optical cable excellent in resistance to pressure break, mechanical properties and thermal durability.

The entire disclosure of Japanese Patent Application No. 2001-53625 filed on Feb. 28, 2001 including specification, claims, drawings and summary are incorporated herein by reference in its entirety.

What is claimed is:

1. An optical fiber cable comprising:
   two or more optical fibers and a partitioning spacer housed in a space encircled by a sheath;
   the partitioning spacer including an axial portion end a plurality of partitioning plate portions;
   the partitioning spacer having a sectional shape that the partitioning plate portions radially extend toward an inner circumferential surface of the sheath from the axial portion; and
   each of the partitioning plate portions having a leading end provided with an enlarged portion in contact with the inner circumferential surface of the sheath and a connecting portion connecting the enlarged portion to the axial portion, wherein the enlarged portion has a substantially circular shape in cross section;
   wherein the space encircled by the sheath is divided into a plurality of partitioned slots by the partitioning plate portions, and the respective optical fibers are distributed in the plurality of partitioned slots so that two or more optical fibers are not provided in a single partitioned slot.

2. An optical fiber cable comprising:
   two or more optical fibers and a partitioning spacer housed in a space encircled by a sheath;
   the partitioning spacer including an axial portion and a plurality of partitioning plate portions;
   the partitioning spacer having a sectional shape that the partitioning plate portions radially extend toward on inner circumferential surface of the sheath from the axial portion; and
   each of the partitioning plate portions having a leading end provided with an enlarged portion in contact with the inner circumferential surface of the sheath and a connecting portion connecting the enlarged portion to the axial portion;
   wherein the space encircled by the sheath is divided into a plurality of partitioned slots by the partitioning plate portions, and the respective optical fibers are distributed in the plurality of partitioned slots so that two or more optical fibers are not provided in a single partitioned slot, and
   wherein at least one tension member is provided in a partitioned slot without an optical fiber provided therein.

3. An optical fiber cable comprising:
   two or more optical fibers and a partitioning spacer housed in a space encircled by a sheath;
   the partitioning spacer including an axial portion and a plurality of partitioning plate portions;
   the partitioning spacer having a sectional shape that the partitioning plate portions radially extend toward an inner circumferential surface of the sheath from the axial portion; and
   each of the partitioning plate portions having a leading end provided with an enlarged portion in contact with the inner circumferential surface of the sheath and a connecting portion connecting the enlarged portion to the axial portion;
   wherein the space encircled by the sheath is divided into a plurality of partitioned slots by the partitioning plate portions, and the respective optical fibers are distributed in the plurality of partitioned slots so that two or more optical fibers are not provided in a single partitioned slot, and
   wherein at least one selected from the group consisting of a power line and an information transmission line is provided in a partitioned slot without an optical fiber provided therein.

4. The optical fiber cable according to claim 1, wherein the sheath has a hardness of not higher than 95 Shore A hardness.

5. The optical fiber cable according to claim 4, wherein the sheath consists of thermoplastic resin, and the thermoplastic resin is one selected from soft vinyl chloride, chlorinated polyethylene and soft polyethylene.

6. An optical fiber cable comprising:

two or more optical fibers and a partitioning spacer housed in a space encircled by a sheath;

the partitioning spacer including an axial portion and a plurality of partitioning plate portions;

the partitioning spacer having a sectional shape that the partitioning plate portions radially extend toward an inner circumferential surface of the sheath from the axial portion; and each of the partitioning plate portions having a leading end provided with an enlarged portion in contact with the inner circumferential surface of the sheath and a connecting portion connecting the enlarged portion to the axial portion;

wherein the space encircled by the sheath is divided into a plurality of partitioned slots by the partitioning plate portions, and the respective optical fibers are distributed in the plurality of partitioned slots so that two or more optical fibers are not provided in a single partitioned slot, end wherein the sectional shape of the partitioning spacer has the following relations (1) and (2) when each of the enlarged portion has a maximum dimension L in a direction perpendicular to a radial direction, each of the connecting portion has a length K in the radial direction, each of the connecting portion has a dimension W in the direction perpendicular to the radial direction, end each of the optical fibers has an outer diameter R:

$$L-W \geq R \quad (1)$$

$$K \geq R \quad (2).$$

7. The optical fiber cable according to claim 6, wherein at least one tension member is provided in a partitioned slot without an optical fiber provided therein.

8. The optical fiber cable according to claim 6, wherein at least one selected from the group consisting of a power line and an information transmission line is provided in a partitioned slot without an optical fiber provided therein.

9. The optical fiber cable according to claim 6, wherein the sheath has a hardness of not higher than 95 Shore A hardness.

10. The optical fiber cable according to claim 9, wherein the sheath consists of thermoplastic resin, and the thermoplastic resin is one selected from soft vinyl chloride, chlorinated polyethylene and soft polyethylene.

11. The optical fiber cable according to claim 1, wherein the optical fibers comprise graded refractive index plastic optical fibers.

12. An optical fiber cable comprising:

two or more optical fibers and a partitioning spacer housed in a space encircled by a sheath;

the partitioning spacer including an axial portion and a plurality of partitioning plate portions;

the partitioning spacer having a sectional shape that the partitioning plate portions radially extend toward an inner circumferential surface of the sheath from the axial portion; and each of the partitioning plate portions having a leading end provided with an enlarged portion in contact with the inner circumferential surface of the sheath and a connecting portion connecting the enlarged portion to the axial portion;

wherein the space encircled by the sheath is divided into a plurality of partitioned slots by the partitioning plate portions, and the respective optical fibers are distributed in the plurality of partitioned slots so that two or more optical fibers are not provided in a single partitioned slot, wherein the optical fibers comprise graded refractive index plastic optical fibers, and wherein at least one tension member is provided in a partitioned slot without an optical fiber provided therein.

13. An optical fiber cable comprising:

two or more optical fibers and a partitioning spacer housed in a space encircled by a sheath;

the partitioning spacer including an axial portion and a plurality of partitioning plate portions;

the partitioning spacer having a sectional shape that the partitioning plate portions radially extend toward an inner circumferential surface of the sheath from the axial portion; and each of the partitioning plate portions having a leading end provided with an enlarged portion in contact with the inner circumferential surface of the sheath and a connecting portion connecting the enlarged portion to the axial portion;

wherein the space encircled by the sheath is divided into a plurality of partitioned slots by the partitioning plate portions, and the respective optical fibers are distributed in the plurality of partitioned slots so that two or more optical fibers are not provided in a single partitioned slot, wherein the optical fibers comprise graded refractive index plastic optical fibers, and wherein at least one selected from the group consisting of a power line and an information transmission line is provided in a partitioned slot without an optical fiber provided therein.

14. The optical fiber cable according to claim 11, wherein the sheath has a hardness of not higher than 95 Shore A hardness.

15. The optical fiber cable according to claim 14, wherein the sheath is made of thermoplastic resin, and the thermoplastic resin is one selected from soft vinyl chloride, chlorinated polyethylene and soft polyethylene.

16. A method for making an optical fiber cable defined in claim 1, comprising distributing the optical fibers in the partitioning spacer, and then forming the sheath by thermoplastic resin extruded from a resin extruder.

17. A method for making an optical fiber cable comprising two or more optical fibers and a partitioning spacer housed in a space encircled by a sheath, the partitioning spacer including an axial portion and a plurality of partitioning plate portions, the partitioning spacer having a sectional shape that the partitioning plate portions radially extend toward an inner circumferential surface of the sheath from the axial portion, and each of the partitioning plate portions having a leading end provided with an enlarged portion in contact with the inner circumferential surface of the sheath and a connecting portion connecting the enlarged portion to the axial portion, wherein the apace encircled by the sheath is divided into a plurality of partitioned slots by the partitioning plate portions, and the respective optical fibers are distributed so that two or more optical fibers are not provided in a single partitioned slot, said method comprising:

distributing the optical fibers in the partitioning spacer, and then forming the sheath by thermoplastic resin extruded from a resin extruder, and heat-treating the partitioning spacer under a thermal environment at 70–90° C. before preparation of the optical fiber cable.

* * * * *